(12) United States Patent
Rowe

(10) Patent No.: US 7,617,151 B2
(45) Date of Patent: Nov. 10, 2009

(54) ALTERNATIVE PLAYER TRACKING TECHNIQUES

(75) Inventor: Richard E. Rowe, Reno, NV (US)

(73) Assignee: IGT, Reno, NV (US)

( * ) Notice: Subject to any disclaimer, the term of this patent is extended or adjusted under 35 U.S.C. 154(b) by 1383 days.

(21) Appl. No.: 09/927,184

(22) Filed: Aug. 6, 2001

(65) Prior Publication Data

US 2003/0028480 A1    Feb. 6, 2003

(51) Int. Cl.
 *G06Q 40/00* (2006.01)
(52) U.S. Cl. .......................................... 705/39; 705/35
(58) Field of Classification Search ............... 705/1–45, 705/110–42
See application file for complete search history.

(56) References Cited

U.S. PATENT DOCUMENTS

| | | | |
|---|---|---|---|
| 5,129,652 A | 7/1992 | Wilkinson ................... 273/139 | |
| 5,265,874 A | 11/1993 | Dickinson et al. | |
| 5,287,269 A * | 2/1994 | Dorrough et al. ............. 705/17 | |
| 5,371,797 A * | 12/1994 | Bocinsky, Jr. ................. 705/70 | |
| 5,451,756 A | 9/1995 | Holzer et al. | |
| 5,643,086 A | 7/1997 | Alcorn et al. .................. 463/29 | |
| 5,741,183 A | 4/1998 | Acres et al. .................... 463/42 | |
| 5,761,647 A | 6/1998 | Boushy ......................... 705/10 | |
| 5,811,772 A | 9/1998 | Lucero | |
| 5,823,879 A * | 10/1998 | Goldberg et al. .............. 463/42 | |
| 5,833,540 A | 11/1998 | Miodunski et al. ............ 463/42 | |
| 5,919,091 A | 7/1999 | Bell et al. | |
| 5,951,397 A | 9/1999 | Dickinson ..................... 463/36 | |
| 5,952,640 A | 9/1999 | Lucero | |
| 6,003,013 A | 12/1999 | Boushy et al. ................. 705/10 | |
| 6,048,269 A | 4/2000 | Burns et al. .................... 463/25 | |
| 6,089,975 A | 7/2000 | Dunn ........................... 463/16 | |
| 6,104,815 A | 8/2000 | Alcorn et al. ................. 380/251 | |
| 6,106,396 A | 8/2000 | Alcorn et al. .................. 463/29 | |
| 6,113,495 A | 9/2000 | Walker et al. .................. 463/42 | |
| 6,149,522 A | 11/2000 | Alcorn et al. .................. 463/29 | |
| 6,162,122 A | 12/2000 | Acres et al. .................... 463/29 | |
| 6,178,407 B1 * | 1/2001 | Lotvin et al. ................... 705/14 | |
| 6,183,362 B1 | 2/2001 | Boushy ......................... 463/25 | |
| 6,210,279 B1 | 4/2001 | Dickinson .................... 463/37 | |
| 6,244,958 B1 | 6/2001 | Acres ........................... 463/26 | |
| 6,450,885 B2 * | 9/2002 | Schneier et al. ............... 463/29 | |
| 6,457,640 B2 * | 10/2002 | Ramachandran et al. ..... 235/379 | |
| 6,645,068 B1 * | 11/2003 | Kelly et al. ..................... 463/9 | |

(Continued)

FOREIGN PATENT DOCUMENTS

WO    9600427 A1    1/1996

OTHER PUBLICATIONS

Tanya Bell et al., "Rolling dice on the net attacting attention/ Some officials want crackdown", Colorado Springs, Coo.l: Oct. 17, 1997., p. A1.*

(Continued)

*Primary Examiner*—Frantzy Poinvil
(74) *Attorney, Agent, or Firm*—Weaver Austin Villeneuve & Sampson LLP.

(57) ABSTRACT

Methods and apparatus are described for registering a player with a player tracking system on a gaming network. A player tracking account is created for the player using player information derived from an account card associated with the player. The account card corresponds to a remote account unrelated to the player tracking system.

44 Claims, 3 Drawing Sheets

U.S. PATENT DOCUMENTS

2002/0002075 A1  1/2002  Rowe

OTHER PUBLICATIONS

Examiner's first report on Australia patent application No. 2002326527, dated Jul. 12, 20007, 2 pages.

"Supplementary European Search Report from counterpart foreign application No. 02 761 248.0," dated Aug. 1, 2006, 4 pages.

Examiner's Report No. 3, dated Nov. 20, 2008, for corresponding Australian Patent Application No. 2002326527.

Examination Report dated Mar. 27, 2009, for corresponding European Patent Application No. 02761248.0.

Examiner's Report No. 2, dated Sep. 2, 2008, for corresponding Australian Patent Application No. 2002326527.

* cited by examiner

ALTERNATIVE PLAYER TRACKING TECHNIQUES

BACKGROUND OF THE INVENTION

This invention relates to game playing methods for gaming machines such as video slot machines and video poker machines. More particularly, the present invention relates to methods and apparatus for providing player tracking services in a gaming environment.

There are a wide variety of associated devices that can be connected to a gaming machine such as a slot machine or video poker machine. Some examples of these devices are player tracking units, lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a players attention to various game features and to heighten the players interest in additional game play. Maintaining a game player's interest in game play, such as on a gaming machine or during other gaming activities (e.g., table or pit games), is an important consideration for an operator of a gaming establishment.

One related method of gaining and maintaining a game player's interest in game play are player tracking programs which are offered at various casinos. Player tracking programs provide rewards to players that typically correspond to the player's level of patronage (e.g., to the player's playing frequency and/or total amount of game plays at a given casino). Player tracking rewards may be free meals, free lodging and/or free entertainment. These rewards may help to sustain a game player's interest in additional game play during a visit to a gaming establishment and may entice a player to visit a gaming establishment to partake in various gaming activities.

In general, player tracking programs may be applied to any game of chance offered at a gaming establishment. In particular, player tracking programs are very popular with players of mechanical slot gaming machines, video slot gaming machines, and table games. In a gaming machine, a player tracking program may be implemented using a player tracking unit associated with the gaming machine and in communication with a player tracking server.

Typically, when a game player wants to play a game on a gaming machine and utilize the player tracking services, a game player inserts a player tracking card, such as a magnetic striped card, into a card reader associated with the gaming machine. After the magnetic striped card has been so inserted, the player tracking unit associated with the machine may detect this event and receive certain identification information contained on the card. For example, a player's name, address, and player tracking account number encoded on the magnetic striped card may be received by the player tracking unit. In general, a player must provide identification information of some type to utilize player tracking services available on a gaming machine. For current player tracking programs, the most common approach for providing identification information is to issue a magnetic-striped card storing the necessary identification information to each player that wishes to participate in a given player tracking program.

Player tracking cards and player tracking programs are becoming more and more popular. They have become an extremely effective marketing method for gaming establishments. The programs allow a casino to identify and reward customers based upon their previous game play history. In particular, a goal of the casinos is to identify and then to provide a higher level of service to certain groups of players identified as especially valuable to the casinos. For instance, players that visit the casino, on average, once a week may be deemed as "special" customers and the casino may desire to cultivate a "special" relationship with these customers.

Disadvantages associated with conventional player tracking systems which inhibit a gaming establishment's ability to provide player tracking services to a significant number of customers relate to the manner in which individual player tracking accounts are typically created. That is, the creation of a player tracking account typically involves a process by which the player is required to explicitly provide the required personal information, e.g., by filling out a registration form, and is subsequently issued a player tracking card which must be presented each time the player wishes to take advantage of the player tracking program.

Because such a process requires affirmative action on the part of the customer and takes time away from actual gaming, a significant number of casual or infrequent customers will not bother to register. This may be because they don't want to take the time or simply because they are unaware of the existence of the player tracking services. This frustrates one of the primary goals of player tracking systems in that such individuals are precisely the people in whom gaming establishments intend such programs to generate interest.

In addition, the requirement that players present a dedicated player tracking card to avail themselves of player tracking services can itself be a disincentive for some to participate. That is, in an age where the average individual holds multiple membership cards for a variety of incentive programs, e.g., frequent flyer and shopper programs, adding another such card for each gaming establishment one visits is seen by some as undesirable.

It is therefore desirable to provide techniques by which players in gaming establishments can take advantage of player tracking programs and which overcome the aforementioned disadvantages.

SUMMARY OF THE INVENTION

According to specific embodiments of the present invention, an individual can take any of a variety of membership/account cards, e.g., a frequent flyer or shopper card, or a bank card, put it into a gaming machine (or manually input associated information) and take advantage of player tracking services. One advantage is that the individual does not have to previously set up a player tracking account or apply for a player tracking card to participate in the program.

According to specific embodiments, a player tracking account is created using information derived directly or indirectly from the membership card. That is, according to one embodiment, the player tracking account may be created using information stored on the card itself, e.g., an account number. Alternatively, the player tracking account may be created using information derived by accessing the membership account associated with the inserted membership card. Subsequent player tracking services may then be provided to the user either through the use of the membership card (rather than a dedicated player tracking card), or a subsequently issued player tracking card.

More generally, the present invention provides methods and apparatus for registering a player with a player tracking system on a gaming network. A player tracking account is created for the player using player information derived from an account card associated with the player. The account card corresponds to a remote account unrelated to the player tracking system.

A further understanding of the nature and advantages of the present invention may be realized by reference to the remaining portions of the specification and the drawings.

DETAILED DESCRIPTION OF SPECIFIC EMBODIMENTS

An exemplary player tracking system in which various specific embodiments of the present invention may be implemented will now be described with reference to FIGS. 1 and 2. It should be understood at the outset that this player tracking system is described merely for illustrative purposes and that the present invention may be implemented in any of a wide variety of player tracking systems. Therefore, the scope of the invention should not be limited to the player tracking system described.

Figure 1:
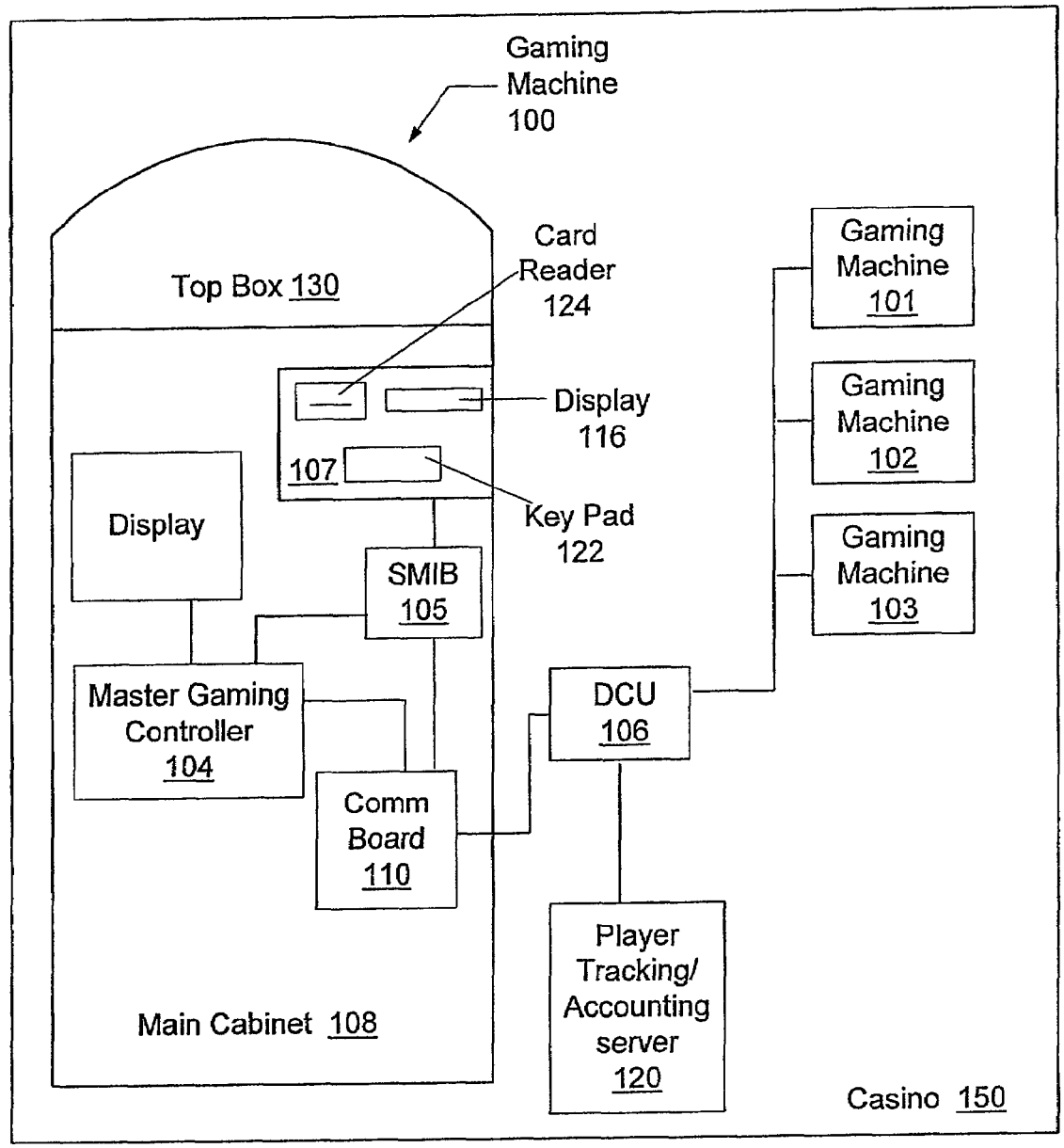
FIG. 1 is a block diagram of a player tracking system in which various embodiments of the present invention may be practiced.

FIG. 1 is a simplified block diagram of a gaming network including a number of gaming machines with player tracking units connected to a server providing player tracking services. In casino 150, gaming machines 100, 101, 102 and 103 are connected via the data collection unit (DCU) 106 to the player tracking/accounting server 120. The DCU 106, which, in a specific embodiment, may be connected to up to 32 player tracking units as part of a local network, consolidates the information gathered from player tracking units in gaming machines 100, 101, 102 and 103 and forwards the information to the player tracking account server 120. The player tracking account server is designed 1) to store player tracking account information such as information regarding a player's previous game play, and 2) to calculate player tracking points based on a player's game play that may be used as basis for providing rewards to the player.

In gaming machine 100 of casino 150, a player tracking unit 107 and slot machine interface board (SMIB) 105 are mounted within a main cabinet 108 of the gaming machine. A top box 130 is mounted on top of the main cabinet 108 of the gaming machine. In many types of gaming machines, the player tracking unit is mounted within the top box 130. Usually, player tracking units, such as 107, and SMIBs, such as 105, are manufactured as separate units before installation into a gaming machine, such as 100.

The player tracking unit 107 includes three player tracking devices, a card reader 124, a key pad 122, and a display 116, all mounted within the unit. The player tracking devices are used to input player tracking information that is needed to implement the player tracking program. The player tracking devices may be mounted in many different arrangements depending upon design constraints such as accessibility to the player, packaging constraints of a gaming machine and a configuration of a gaming machine. For instance, the player tracking devices may be mounted flush with a vertical surface in an upright gaming machine and may mounted flush with a horizontal in a table top gaming machine.

The player tracking unit 107 communicates with the player tracking server via the SMIB 105, a main communication board 110, and the data collection unit 106. The SMIB 105 allows the player tracking unit 107 to gather information from the gaming machine 100 such as an amount a player has wagered during a game play session. This information may be used by the player tracking server 120 to calculate player tracking points for the player. The player tracking unit 107 is usually connected to the master gaming controller 104 via a serial connection and communicates with the master gaming controller 104 using a serial communication protocol. The serial connection between the SMIB 105 and the master gaming controller 104 may be through the main communication board 110, through another intermediate device, or through a direct connection to the master gaming controller 104. As an example of a serial communication protocol, the master gaming controller 104 may employ a subset of the Slot Accounting System (SAS protocol) developed by International Game Technology of Reno, Nev., to communicate with the player tracking unit 107.

Figure 2:
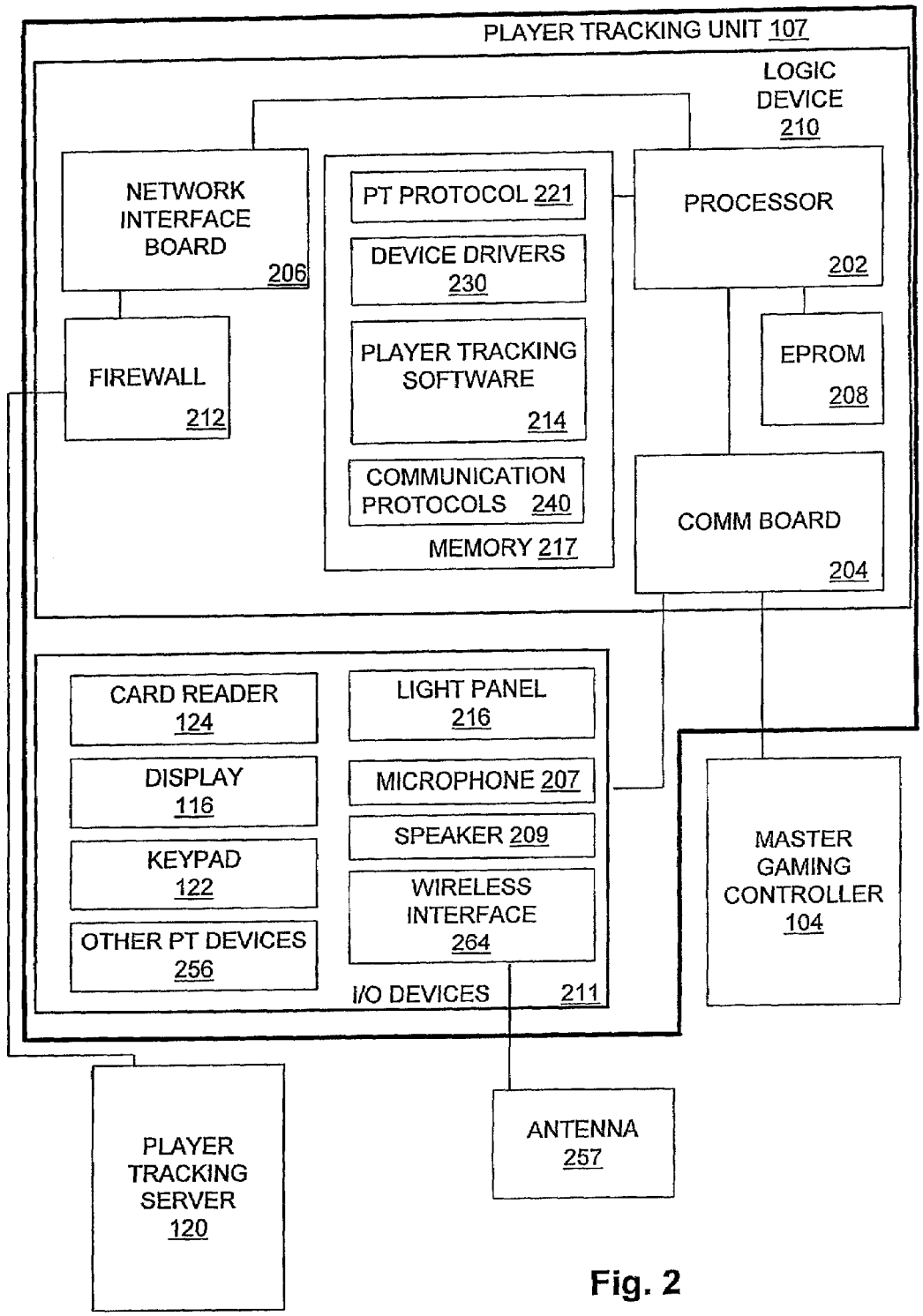
FIG. 2 is a block diagram of a player tracking unit for use with various embodiments of the present invention.

FIG. 2 is a block diagram of a player tracking unit for use with various embodiments of the present invention. Player tracking unit 107 is connected to a master gaming controller 104 on a gaming machine and a player tracking server 120. The player tracking unit 107 includes a logic device 210 enclosed in a logic device housing and a number of player tracking interface devices including a card reader 124, a display 116, a key pad 122, a light panel 216, a speaker 209, a microphone 207, a wireless interface 264, and other player tracking interface devices 256 enclosed in a device housing 211. The logic device 210 for the player tracking unit and the player tracking interface devices may be enclosed in a single housing or separate housings.

The logic device 210 may include a processor 202 for executing software allowing the player tracking unit to perform various player tracking functions such as communicating with the player tracking server 120, communicating with the master gaming controller 104, or operating the various peripheral devices such as the card reader 124, the display 116, the key pad 122 and the light panel 216. For instance, the logic device 210 may send messages containing player tracking information to the display 116. As another example, the logic device 210 may send commands to the light panel 216 to display a particular light pattern and to the speaker 209 to project a sound and convey audible game information. The logic device 210 may utilize a microprocessor and/or microcontrollers. For instance, the light panel 216 may include a microcontroller that converts signals from the processor 202 to voltage levels for one or more illumination devices. In one embodiment, application software for the player tracking unit 107 and configuration information for the player tracking unit may be stored in a memory device such as an EPROM 208, a non-volatile memory, a hard drive, or a flash memory.

The player tracking unit may include a memory 217 configured to store: 1) player tracking software 214 such as data collection software, 2) player tracking communication protocols 221 allowing the player tracking unit 107 to communicate with different types of player tracking servers, 3) device drivers 230 for many types of player tracking interface devices, 4) voice recognition software for receiving voice commands from the microphone 207, and 5) communication transport protocols 240 such as, for example, TCP/IP, USB, Firewire, IEEE 1394, or Bluetooth, allowing the player tracking unit to communicate with devices using these protocols, or allowing the logic device to communicate with different types of master gaming controllers (i.e., master gaming controllers using different types of communication protocols), such as 104. Typically, the master gaming controller, such as 104, communicates using a serial communication protocol. A few examples of serial communication protocols that may be used to communicate with the master gaming controller include but are not limited to USB, RS-232, and Netplex (a proprietary protocol developed by IGT, Reno, Nev.).

A plurality of device drivers 230 may be stored in memory 217 for each type of player tracking device. For example, device drivers for five different types of card readers, six different types of displays, and 8 different types of key pads may be stored in the memory 217. When one type of a particular peripheral device is exchanged for another type of the particular device, a new device driver may be loaded from the memory 217 by the processor 202 to allow communication with the device. For instance, one type of card reader in the player tracking unit 107 may be replaced with a second type of card reader where device drivers for both card readers are stored in the memory 217.

In some embodiments, the software units stored in the memory 217 may be upgraded as needed. For instance, when the memory 217 is a hard drive, new device drivers or new communication protocols may be uploaded to the memory from the master gaming controller 104, the player tracking server 120, or from some other external device. As another example, when the memory 217 is a CD/DVD drive containing a CD/DVD designed or configured to store the player tracking software 214, the device drivers 230, and other communication protocols 221 and 240, the software stored in the memory may be upgraded by replacing a first CD/DVD with a second CD/DVD. In yet another example, when the memory 217 uses one or more flash memory units designed or configured to store the player tracking software 214, the device drivers 230, and other communication protocols 221 and 240, the software stored in the flash memory units may be upgraded by replacing one or more flash memory units with new flash memory units storing the upgraded software.

In one embodiment of the present invention, a minimal set of player tracking software applications 214, communication protocols 240, player tracking communication protocols 221, and device drivers 230 may be stored in the memory 217. For instance, an operating system, a communication protocol allowing the player tracking unit 107 to communicate with a remote server such as the player tracking server 120 and one or more common player tracking applications may be stored in memory 217. When the player tracking unit is powered-up, the player tracking unit 107 may contact a remote server 120 and download specific player tracking software from the remote software. The downloaded software may include but is not limited to one or more particular player tracking applications that are supported by the remote server, particular device drivers, player tracking software upgrades, and a particular communication protocol supported by the remote server.

In some embodiments, the player tracking functions may be implemented by both the logic device 210 and the master gaming controller 104. For instance, the master gaming controller may execute voice recognition software to interpret voice commands input from the microphone 207. Thus, player tracking software such as the player tracking protocols may be stored on a memory located on the gaming machine which is separate from the player tracking unit. In some embodiments, the player tracking software stored in the memory in the gaming machine may be executed by the master gaming controller 104 in the gaming machine. In other embodiments, the player tracking software stored in the memory in the gaming machine may be executed by the logic device 210 in the player tracking unit.

The logic device 210 includes a network interface board 206 configured or designed to allow communication between the player tracking unit 107 and other remote devices such as the player tracking server residing on a local area networks such as a casino area network, a personal area network such as a piconet (e.g., using Bluetooth), or a wide area network such as the Internet. The network interface board 206 may allow wireless or wired communication with the remote devices. The network interface board may be connected to a firewall 212. The firewall may be hardware, software, or combinations of both that prevent illegal access of the gaming machine by an outside entity connected to the gaming machine. The internal firewall is designed to prevent someone such as a hacker from gaining illegal access to the player tracking unit or gaming machine and tampering with it in some manner. For instance, an illegal access may be an attempt to plant a program in the player tracking unit that alters the operation of the gaming machine allowing it to perform an unintended function.

The communication board 204 may be configured to allow communication between is the logic device 210 and the player tracking interface devices including 124, 116, 122, 216, 207, 209, and 256 and to allow communication between the logic device 210 and the master gaming controller 104. The wireless interface 264 may be used to allow the player tracking unit and possibly the master gaming controller 104 to communicate with portable wireless devices or stationary devices using a wireless communication standard. The wireless interface 264 may be connected to an antenna 257. In some embodiments, the wireless interface 264 may be incorporated into the communication board 204. In addition, in some embodiments, the logic device 210 and the master gaming controller 104 may communicate using a non-proprietary standard wireless communication protocol such as Bluetooth or using a non-proprietary standard wired communication protocol such as USB, Firewire, IEEE 1394 and the like. In other embodiments, the logic device 210 and the master gaming controller may communicate using a proprietary communication protocol used by the manufacturer of the gaming machine.

The communication between the player tracking unit 107 and 1) the player tracking interface devices, 2) the master gaming controller 104, 3) the player tracking server 120 and 4) any other external or internal gaming devices may be encrypted. In one embodiment, the logic device 210 may poll the player tracking interface devices for information. For instance, the logic device 210 may poll the card reader 124 to determine when a card has been inserted into the card reader or may poll the key pad 122 to determine when a button key has been depressed. In some embodiments, the player tracking interface devices may contact the logic device 210 when a player tracking event such as a card being inserted into the card reader has occurred.

The logic device 210 may poll the master gaming controller 104 for game usage information. For instance, the logic device 210 may send a message to the master gaming controller 104 such as "coin-in." The master gaming controller may respond to the "coin-in" message with an amount when credits are registered on the gaming machine.

The logic device 210, using an appropriate device driver, may send instructions to the various player tracking interface devices to perform specific operations. For instance, after a card has been inserted into the card reader 124, the processor logic device may send a "read card" instruction to the card reader, a "display message A" instruction to the display 116, and a "good luck" voice message to speaker 209. In addition, the logic device 210 may be configured to allow the master gaming controller 104 to send instructions to the player tracking interface devices via the logic device 210. As an example, after a card has been inserted into the card reader 124, the processor logic 210 may determine that the card is for a gaming application controlled by the master gaming controller 104 and send a message to the master gaming controller 104 indicating a card has been inserted into the card reader. In response, to the message from the logic device, the master gaming controller 104 may send a series of commands to the player tracking interface devices such as a "read card" instruction to the card reader 124, a flash light pattern "A" command to the light panel 216, and a "display message" instruction to the display 116 via the logic device 210. The instructions from the master gaming controller 104 to the player tracking interface devices may be obtained from gaming application software executed by the master gaming controller 104. The gaming application software may or may not be related to player tracking services.

The player tracking unit 107 may include one or more standard peripheral communication connections (not shown). The logic device 210 may be designed or configured to communicate with the master gaming controller 104 and the player tracking interface devices using a standard peripheral connection, such as an USB connector, and using a standard communication protocol, such as USB. The USB standard allows for a number of standard USB connectors that may be used with the present invention. The player tracking unit 107 may contain a hub connected to the peripheral communication connection and containing a plurality of peripheral communication connections.

Figure 3:
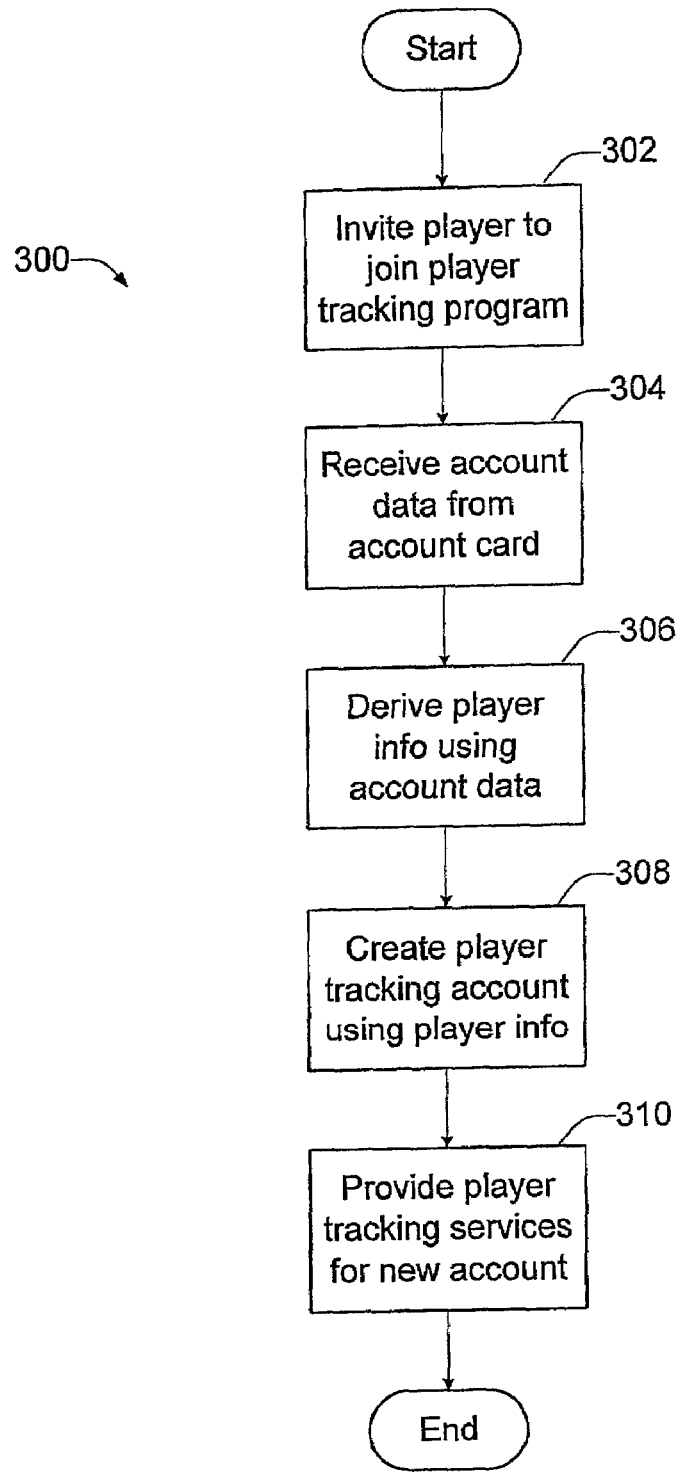
FIG. 3 is a flowchart illustrating creation of a player tracking account according to a specific embodiment of the present invention.

A specific embodiment of the present invention in which a player of a gaming machine (e.g., machine 100 of FIG. 1) is registered with a player tracking system will now be described with reference to flowchart 300 of FIG. 3. The player, who has either not previously participated in the gaming venue's player tracking program (or gaming site's program where the gaming environment is a wide area network such as the Internet), or has forgotten or misplaced their player tracking card, is invited to participate in the player tracking program (302) by providing account data unrelated to the player tracking system such as, for example, account data from an incentive program (e.g., frequent flyer or shopper accounts), a financial account (e.g., debit or credit cards), a membership (e.g., Costco), etc. Such an invitation might be presented, for example, on a screen or via an audio playback mechanism.

The account data may be provided to the player tracking system when, for example, the player inserts a corresponding account or membership card into the card reader associated with the gaming machine (e.g., card reader 124 of FIGS. 1 and 2). Alternatively, the player may enter the data (e.g., an account type and number) manually using a touch-screen or a key pad (e.g., key pad 122 of FIGS. 1 and 2), or some other input mechanism such as, for example, a voice recognition system. The latter set alternatives may be useful, for example, where the gaming environment is a wide area network (e.g., the Internet) and the gaming machine is a client machine (e.g., a personal computer).

When the account data provided by the player are received (304), player information is derived for the purpose of generating the player tracking account (306). According to some embodiments, the player information may simply correspond to some subset of the account data received in 304. That is, for example, an account number read from the information encoded in the magnetic strip of a frequent flyer card from a particular airline might be used to create the player tracking account without any additional information, player tracking services being provided each time gaming activity associated with that account number occurs.

Alternatively, the player information derived in 306 may be retrieved directly from the provider of the remote account to which the account data correspond. That is, where the account data identify a frequent flyer account, a request may be sent to the remote system which manages the frequent flyer account to provide personal information about the card holder for the purpose of setting up the player tracking account. In embodiments where the player information is derived by this type of access to the membership account, a relationship with the provider of that account, e.g., the airline issuing the frequent flyer card, is established which provides for the necessary access.

According to some of the embodiments in which a relationship exists between the gaming establishment and the provider of the remote account, the gaming activity in which the player engages may be used to facilitate player tracking services as well as the services associated with the membership card, e.g., the player could also accrue frequent flyer miles according to the level of gaming activity.

According to specific embodiments, the system of the present invention has the capability of recognizing the type of card inserted by reference to the account number encoded on the card or by some other technique, e.g., user input. According to another specific embodiment, where the account is a financial account associated with, for example, a debit or a credit card, the present invention is operable to further facilitate an electronic funds transfer (EFT) from the account directly to the player tracking account being generated. The funds from such an EFT may then be used to facilitate gaming activity by the player.

Regardless of the manner in which the player information is derived, it is then used to create the player tracking account (308) which, in turn, is used to facilitation player tracking services associated with the newly created account. Examples of player tracking services are described above with reference to FIGS. 1 and 2. However, it will be understood that the scope of the present invention extends to a much wider variety of player tracking services, programs, and systems than those described herein.

While the invention has been particularly shown and described with reference to specific embodiments thereof, it will be understood by those skilled in the art that changes in the form and details of the disclosed embodiments may be made without departing from the spirit or scope of the invention. For example, specific embodiments have been described herein with reference to incentive program membership cards, financial institution cards, and the like. It will be understood, however, that any of a variety of membership, account, or identification cards may be used including, for example, identification cards such as state issued ID cards and driver's licenses. That is, embodiments of the present invention are contemplated in which the information encoded on such cards and/or remotely stored information associated with such cards are employed to enable an individual to take advantage of player tracking services.

Moreover, it will be understood that the present invention relates to a variety of gaming environments including, for example, gaming networks at single properties, gaming networks across multiple properties, and wide area networks such as the Internet. Embodiments of the invention relating to gaming networks across multiple properties allow the player to take advantage of player tracking programs relating to, for example, an entire global chain of casinos.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for registering a player with a player tracking system comprising a plurality of gaming machines associated with a plurality of player tracking units and a player tracking server for managing the player tracking system by interacting with the player tracking units, said system provided to track the activities of the player on a gaming network connected with the server, comprising:
    receiving on a gaming machine an account card associated with a player, the account card corresponding to a remote account unrelated to the player tracking system of the gaming network;
    deriving from the account card player information regarding the player;
    creating on the player tracking server or the gaming machine, based on the player information derived from the account card, a player tracking account for tracking the activities of the player on the gaming network; and
    thereby allowing the player to be registered with the player tracking system without requiring the player to specify the player information used to create the player tracking account.

2. The method of claim 1 further comprising enabling participation by the player in the player tracking system using the account card subsequent to creating the player tracking account.

3. The method of claim 1 wherein deriving the player information from the account card comprises reading encoded information form the account card.

4. The method of claim 1 wherein deriving the player information from the account card comprises requesting the player information from the remote account identified by the account card.

5. The method of claim 4 further comprising effecting an electronic funds transfer from the remote account to the player tracking account.

6. The method of claim 1 further providing a player tracking card to the player subsequent to creating the player tracking account and enabling participation by the player in the player tracking system using the player tracking card.

7. The method of claim 1 wherein the account card comprises any of a frequent flyer card, a frequent shopper card, a membership card, a credit card, a debit card, a driver's license, and an identification card.

8. The method of claim 1 further comprising receiving encoded data from the account card via a card reading device.

9. The method of claim 1 further comprising receiving data relating to the account card and manually entered by the player.

10. The method of claim 1 further comprising determining an account card type for the account card.

11. The method of claim 10 where the account card type is determined from encoded information read from the account card.

12. The method of claim 10 wherein the account card type is determined from manually entered information.

13. The method of claim 1 further comprising providing additional services associated with the remote account and in response to interaction between the player and the player tracking system.

14. The method of claim 1 wherein the gaming network is associated with a single gaming establishment.

15. The method of claim 1 wherein the gaming network is associated with multiple gaming establishments.

16. The method of claim 1 wherein the gaming network comprises a local area network.

17. The method of claim 1 wherein the gaming network comprises a wide area network.

18. A player tracking system in a gaming network, comprising:
    a plurality of gaming machines;
    a plurality of player tracking units associated with the gaming machines;
    a network interconnecting the gaming machines and player tracking units;
    a player tracking server connected to the network for managing the player tracking system by interacting with the player tracking units; and
    wherein the player tracking system is operable to generate a player tracking account corresponding to a player upon presentation to one of said gaming machines player information derived from an account card associated with the player, the account card corresponding to a remote account unrelated to the player tracking system, thereby allowing the player to be registered with the player tracking system without requiring the player to specify the player information used to create the player tracking account.

19. The player tracking system of claim 18 further being operable to enable participation by the player in the player tracking system using the account card subsequent to generation of the player tracking account.

20. The player tracking system of claim 18 further being operable to derive the player information from the account card by reading encoded information from the account card.

21. The player tracking system of claim 18 further being operable to derive the player information from the account card by requesting the player information from the remote account identified by the account card.

22. The player tracking system of claim 21 further being operable to effect an electronic funds transfer from the remote account to the player tracking account.

23. The player tracking system of claim 18 further being operable to provide a player tracking card to the player subsequent to generation of the player tracking account and to enable participation by the player in the player tracking system using the player tracking card.

24. The player tracking system of claim 18 wherein the account card comprises any of a frequent flyer card, a frequent shopper card, a membership card, a credit card, a debit card, a driver's license, and an identification card.

25. The player tracking system of claim 18 further comprising at least one card reading device for receiving encoded data from the account card.

26. The player tracking system of claim 18 further comprising at least one interface for receiving data relating to the account card and manually entered by the player.

27. The player tracking system of claim 18 further being operable to determine an account card type for the account card.

28. The player tracking system of claim 27 further being operable to determine the account card type from encoded information read from the account card.

29. The player tracking system of claim 27 further being operable to determine the account card type from manually entered information.

30. The player tracking system of claim 18 further being operable to provide additional services associated with the remote account and in response to interaction between the player and the player tracking system.

31. The player tracking system of claim 18 wherein the network is associated with a single gaming establishment.

32. The player tracking system of claim 18 wherein the network is associated with multiple gaming establishments.

33. The player tracking system of claim 18 wherein the gaming network comprises a local area network.

34. The player tracking system method of claim 18 wherein the gaming network comprises a wide area network.

35. At least one computer-readable medium having computer program instructions stored therein for effecting registration of a player with a player tracking system on a gaming network, the computer program instruction being operable to cause at least one computing device to create a player tracking account for the player upon presentation to said computing device player information derived from an account card associated with the player, the account card corresponding to a remote account unrelated to the player tracking system, thereby allowing the player to be registered with the player tracking system without requiring the player to specify the player information used to create the player tracking account.

36. The at least one computer-readable medium of claim 35 wherein the computer program instructions are further operable to enable participation by the player in the player tracking system using the account card subsequent to creating the player tracking account.

37. A player tracking system configurable for a computing system operable in a gaming environment, wherein said player tracking system is operable to:
  receive account information associated with an established account for a person, wherein said established account has not been established for tracking said person in said gaming environment;
  determine, based on said account information, player tracking information for creating a player tracking account for tracking said person in said gaming environment; and
  create, based on said player tracking information, said player tracking account in a player tracking database associated with said gaming environment in order to effectively track said player in said gaming environment, thereby creating said player tracking account for said player without requiring said person to specify said account information used to create said player tracking account.

38. A player tracking system as recited in claim 37, wherein said account information is effectively provided by an account card associated with said person, thereby allowing said person to effectively register for said player tracking by providing said account card to said player tracking system.

39. A player tracking system as recited in claim 37, wherein said account information is not for an account issued by or for said gamming environment, thereby allowing player tracking information to be effectively derived from an account issued by an entity other than a gaming entity that issues player tracking account for said gaming environment.

40. A player tracking system as recited in claim 37, wherein said computing system includes a gaming machine (or unit) configurable for game play in said gaming environment.

41. A computer-implemented method for registering a person with a player tracking system comprising a plurality gaming machines each associated with a player tracking unit, and a player tracking server for managing the player tracking system by interacting with the player tracking units, said system provided for tracking players of a gaming environment comprising the plurality of gaming machines, said method comprising:
  receiving on a gaming machine account information associated with an established account for a person, wherein said established account has not been established for tracking said person in said gaming environment;
  determining, based on said account information, player tracking information for creating a player tracking account for tracking said person in said gaming environment; and
  creating on the player tracking server or the gaming machine, based on said player tracking information, said player tracking account in a player tracking database associated with said gaming environment in order to effectively track said player in said gaming environment, thereby creating said player tracking account for said player without requiring said person to specify said account information used to create said player tracking account.

42. A computer-implemented method as recited in claim 41, wherein said method further comprises: providing said account information by an account card associated with said person, thereby allowing said person to effectively register for said player tracking by providing said account card to said player tracking system.

43. A computer-implemented method as recited in claim 41, wherein said account information is not for an account issued by or for said gamming environment, thereby allowing player tracking information to be effectively derived from an account issued by an entity other than a gaming entity that issues player tracking account for said gaming environment.

44. A computer readable medium including computer program code being executed on a computer for registering a person with a player tracking system provided for tracking players of a gaming environment, said computer readable medium comprising:
  computer program code for receiving account information associated with an established account for a person, wherein said established account has not been established for tracking said person in said gaming environment;
  computer program code for determining, based on said account information, player tracking information for creating a player tracking account for tracking said person in said gaming environment; and
  computer program code for creating, based on said player tracking information, said player tracking account in a player tracking database associated with said gaming environment in order to effectively track said player in said gaming environment, thereby creating said player tracking account for said player without requiring said person to specify said account information used to create said player tracking account.

* * * * *

UNITED STATES PATENT AND TRADEMARK OFFICE
CERTIFICATE OF CORRECTION

PATENT NO. : 7,617,151 B2 Page 1 of 1
APPLICATION NO. : 09/927184
DATED : November 10, 2009
INVENTOR(S) : Richard E. Rowe It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1673 days.

Signed and Sealed this

Nineteenth Day of October, 2010

David J. Kappos
*Director of the United States Patent and Trademark Office*